No. 800,564. PATENTED SEPT. 26, 1905.
L. E. GIBSON.
CLUTCH.
APPLICATION FILED MAR. 18, 1905.
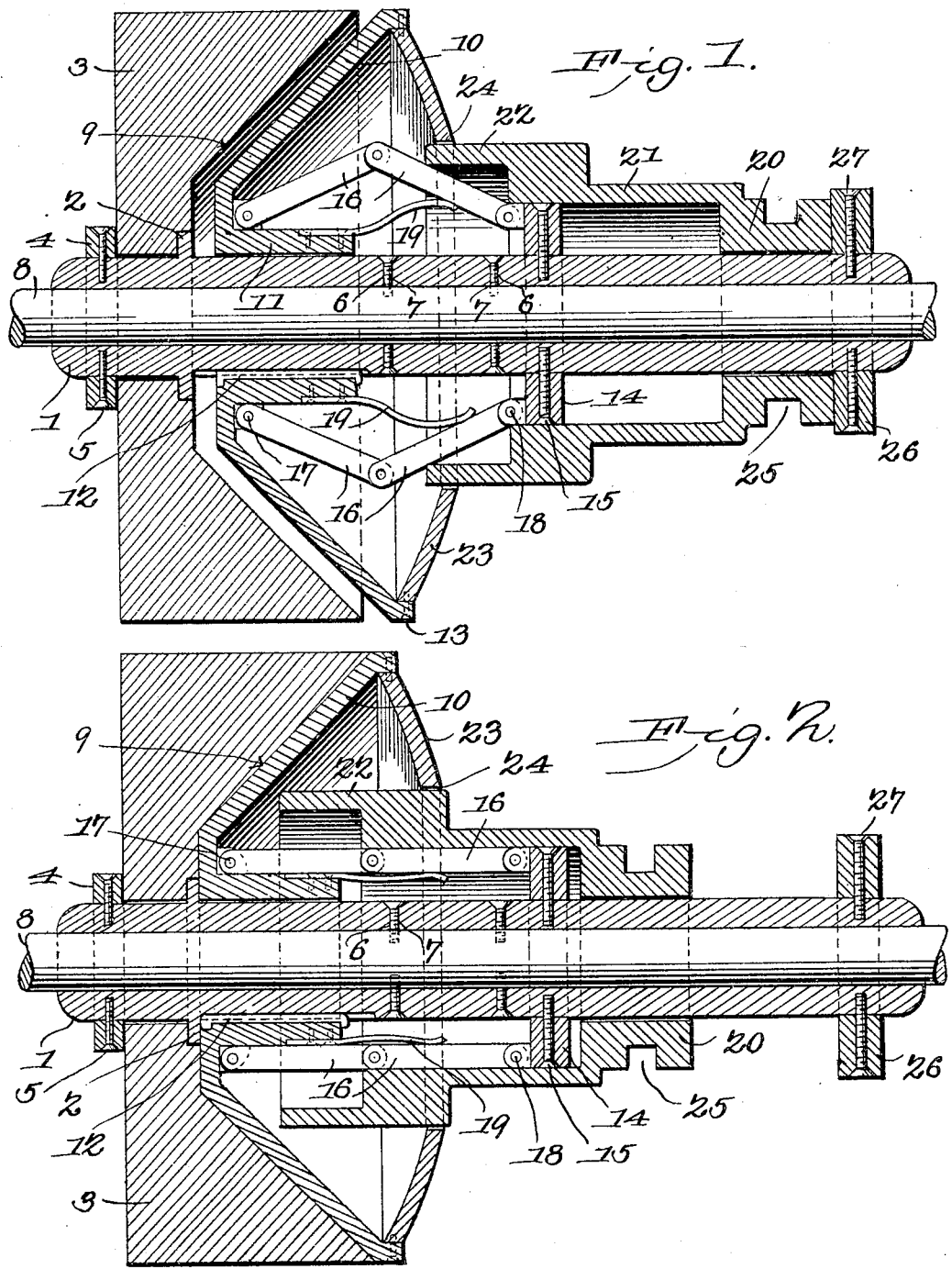
Witnesses
Linzy E. Gibson, Inventor,
by C. A. Snow & Co
Attorneys

UNITED STATES PATENT OFFICE.

LINZY ELSWORTH GIBSON, OF KOKOMO, INDIANA.

CLUTCH.

No. 800,564.        Specification of Letters Patent.        Patented Sept. 26, 1905.

Application filed March 18, 1905. Serial No. 250,848.

*To all whom it may concern:*

Be it known that I, LINZY ELSWORTH GIBSON, a citizen of the United States, residing at Kokomo, in the county of Howard and State of Indiana, have invented a new and useful Clutch, of which the following is a specification.

This invention relates to clutches, and has for its object to provide improvements in this class of devices, so as to particularly adapt the clutch for use in connection with loose pulleys, to have the working parts of the clutch housed in a simple and effective manner and at the same time conveniently accessible for repairs, to enable the convenient controlling of the clutch, to prevent the clutch from accidentally working loose when in operation, and to effect a prompt response when the controller is moved to release the clutch.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a longitudinal sectional view of a clutch embodying the features of the present invention and in its normal inactive position. Fig. 2 is a similar view showing the clutch in operation.

Like characters of reference designate corresponding parts in both figures of the drawings.

The present clutch includes a tubular open-ended core 1, which of course varies in diameter according to the size of the shaft to which the clutch is to be fitted. Adjacent one end of the core there is an integral external annular shoulder 2, with a loose clutch element or pulley 3 rotatably mounted upon the core at the outer side of the shoulder 2 and held thereon by means of a removable collar 4, preferably secured in place by means of countersunk threaded fastenings 5 set into the core. About midway between the ends of the core the latter is provided with countersunk openings 6 for the reception of fastenings 7 to rigidly secure the core to the shaft 8, wherefore it will be understood that the core may be secured at any position upon the shaft merely by forming threaded sockets in the shaft to receive the fastenings 7. The inner face of the clutch member or pulley 3 is provided with an inwardly-tapered socket 9, within which works the slidable clutch member 10, which is in the nature of a conical shell having a hub 11, fixed to but slidable longitudinally upon the core 1 by means of a key 12 in order that the clutch member 11 may be moved into and out of engagement with the member 3. The hub 11 projects into the member 10, but terminates short of the rear or outer end thereof, said outer end being provided with a comparatively short cylindrical flange 13. At a suitable distance in rear of the clutch member 10 there is an annular shoulder or collar 14, fixed upon the core by means of suitable fastenings 15 and capable of being shifted longitudinally upon the core. A plurality of toggle-lever connections extend between the shoulder 14 and the movable clutch member 10, each of these toggle-levers consisting of a pair of pivotally-connected links 16, one of which is pivoted to the hub 11, as at 17, and the other pivotally connected to the shoulder 14, as at 18, there being a leaf-spring 19 secured to the hub and projected rearwardly therefrom, with its free end bearing against the inner side of the rear link 16, so as to force outwardly the joint between the pivotally-connected links.

A slidable controlling-sleeve 20 is mounted upon the core and is provided with stepped or gradually-increasing cylindrical flanges 21 and 22, the flange 21 being of a diameter to work across the shoulder 14 and engage the toggle-levers, so as to bring the same into alinement, and thereby slide the clutch member 10 into frictional engagement with the clutch member 3 to interlock the latter for simultaneous rotation with the core. When the slidable sleeve is withdrawn, the springs 19 immediately force the toggle-levers outwardly, and thereby promptly withdraw the movable clutch member 10 from the member 3, the terminal flange 22 of the slidable sleeve constituting a stop to limit outward movements of the toggle-levers.

A circular shield 23 is removably secured within the cylindrical flange 13 of the clutch member 10 and provided with a central opening 24 to receive the flange 22 of the slidable sleeve 20, whereby the toggle-levers are effectually housed and at the same time access may be had thereto by removing the sleeve 20 and the shield 23. The sleeve 20 is provided with an annular groove 25 for the reception of the usual forked shifting-lever, and there is an annular stop-shoulder 26 secured upon the core by means of suitable fastenings 27 to limit the outward or rearward movement of the slide.

A very important feature of the present invention resides in the fact that all of the operating parts of the clutch are mounted upon the tubular core, and the latter is designed to receive a drive-shaft and is provided with means for fixing the core thereon, whereby all of the operating parts of the clutch may be mounted upon the core in the original manufacture of the clutch in order that the latter may be in readiness for immediate application to a shaft without requiring any setting up or adjustment of the different parts of the device. Another important advantage of the present construction resides in the housing of the toggle-links.

As shown in Fig. 2 of the drawings, it will be noted that the three pivotal points of each toggle-lever are brought into alinement by the controlling-slide 20 when the clutch members are in engagement, whereby it is not necessary to provide extraneous means for preventing accidental backing off of the controlling-slide.

Having fully described the invention, what is claimed is—

1. A clutch including a slidable clutch member, a toggle-lever having one end fixed and its other end connected to the slidable clutch member, a controlling-slide working in frictional engagement with the toggle-lever to move the clutch member forwardly, and a spring operating upon the toggle-lever in opposition to the slide.

2. A clutch comprising a slidable clutch member having a hub, a toggle-lever connected at one end to the hub and having its other end fixed, a spring carried by the hub and bearing against the inner side of the toggle-lever, and a controlling-slide working in frictional engagement with the opposite side of the toggle-lever to move the clutch member forwardly.

3. A clutch including a hollow slidable clutch member, a toggle-lever having one end connected to the clutch member and its opposite end fixed, a controlling-sleeve slidably embracing the toggle-lever in frictional engagement therewith, and a shield carried by the clutch member and embracing the slidable sleeve.

4. A clutch including a slidable clutch member, a toggle-lever having one end connected to the clutch member and its opposite end fixed, and a controlling-slide having a stepped series of shoulders, one of the shoulders working in frictional engagement with the toggle-lever to move the clutch member forwardly, and the other shoulder constituting a stop to limit outward movement of the lever.

5. A clutch comprising a slidable clutch member, a plurality of toggle-levers having corresponding ends connected to the clutch member and their other corresponding ends fixed, springs tending to break outwardly the joints of the levers, and a slidable controlling-sleeve having a pair of stepped internal annular shoulders, the inner shoulder working in frictional engagement with the outer sides of the toggle-levers to force the same inwardly and move the clutch member forwardly, and the other shoulder constituting a stop to limit outward movements of the levers under the influence of the springs.

6. In a clutch, the combination of a tubular core, a loose clutch member rotatable upon the core and provided in its inner face with a concentric conical recess, a hollow substantially conical fast clutch member having a hub fixed to the core and slidable endwise thereon, toggle-levers having corresponding ends connected to the hub with their other corresponding ends connected to the core, springs carried by the hub and bearing against the toggle-levers to break their joints outwardly, a controlling-sleeve slidable upon the core and provided at its inner end with a pair of stepped internal annular shoulders, the inner shoulder frictionally engaging the toggle-levers to force the same inwardly and move the slidable clutch member into engagement with the loose clutch member, the outer shoulder constituting a stop to limit outward movements of the toggle-levers under the influence of the springs, and a shield carried by the outer open end of the slidable clutch member and embracing the slidable sleeve.

In testimony that I claim the foregoing as my own I have hereto affixed my signature in the presence of two witnesses.

LINZY ELSWORTH GIBSON.

Witnesses:
L. L. MURCH,
J. D. JOHNSON.